Feb. 8, 1955            F. F. LINN            2,701,727
STOP MEANS FOR LIMITING VEHICLE AXLE MOVEMENT
Filed Sept. 11, 1950            2 Sheets-Sheet 1
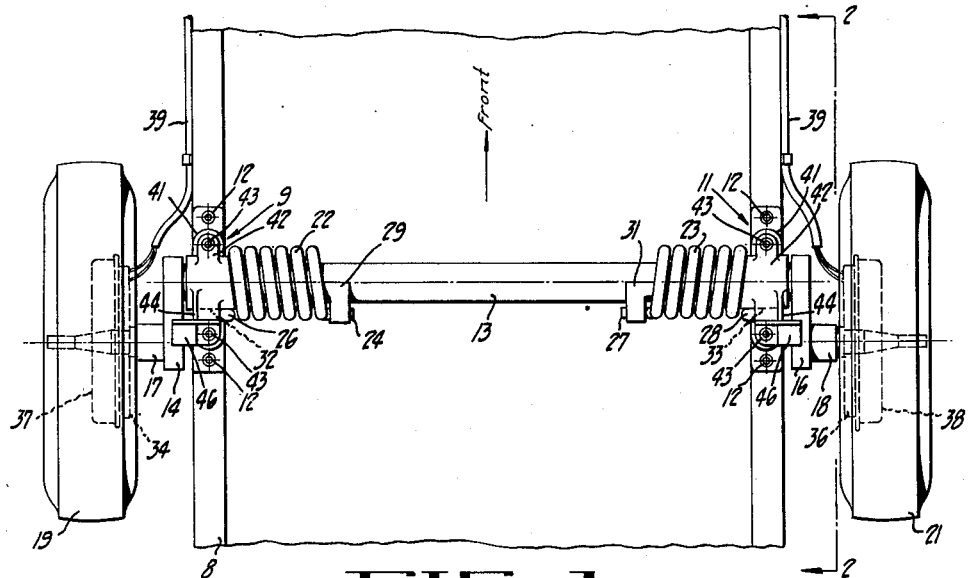
FIG_1_
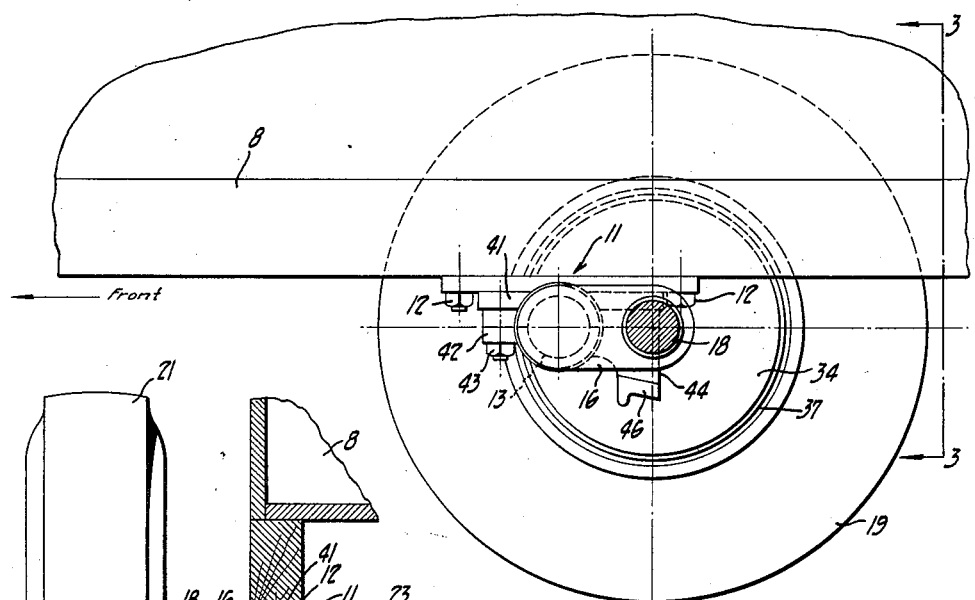
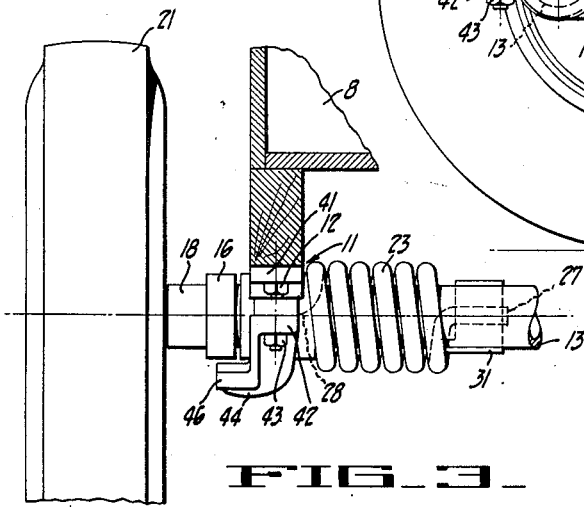
FIG_2_
FIG_3_
INVENTOR.
Frank F. Linn
BY Manfred M. Warren
his attorney Feb. 8, 1955  F. F. LINN  2,701,727
STOP MEANS FOR LIMITING VEHICLE AXLE MOVEMENT
Filed Sept. 11, 1950  2 Sheets-Sheet 2
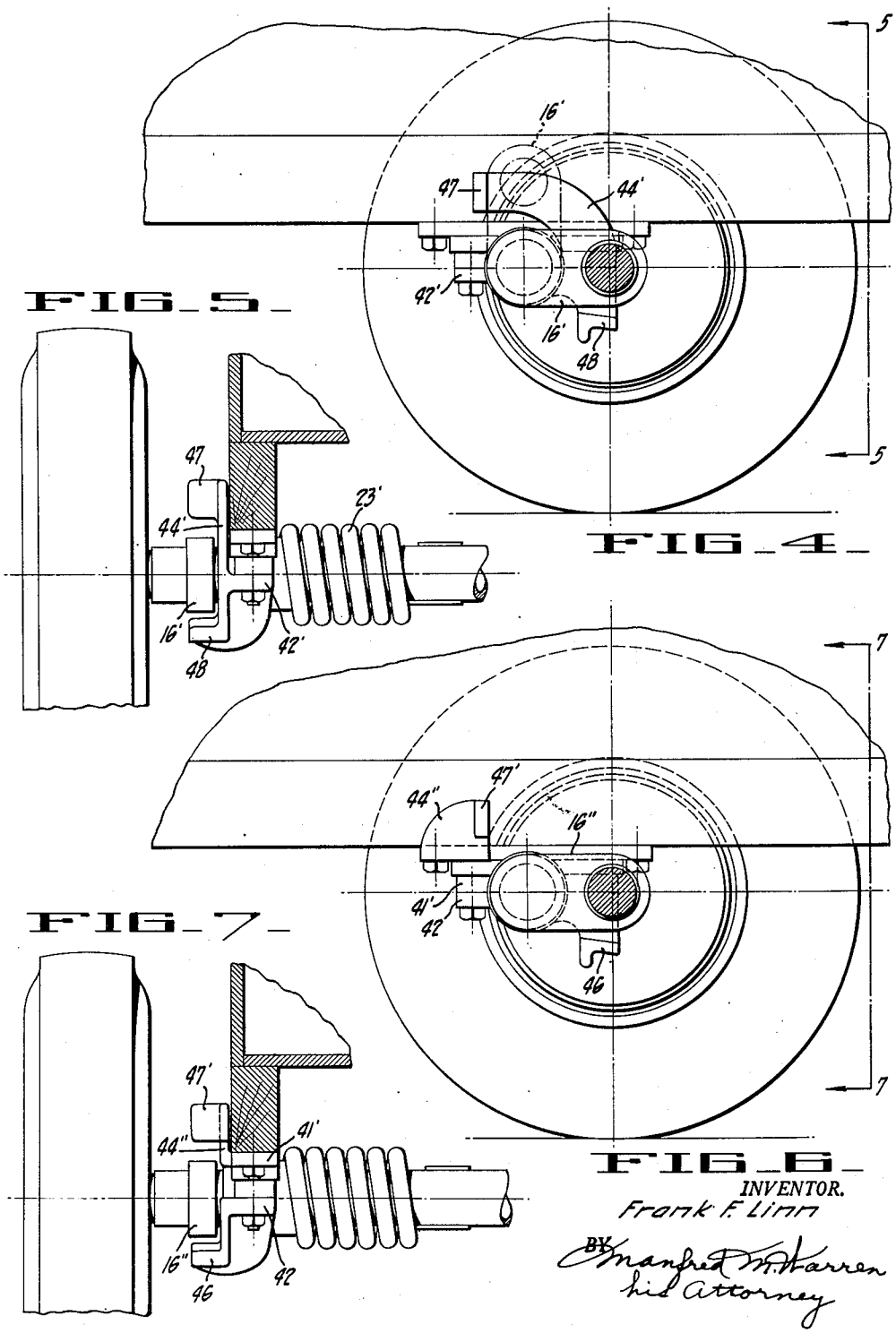
INVENTOR.
Frank F. Linn
BY Manfred M. Warren
his attorney United States Patent Office 2,701,727
Patented Feb. 8, 1955

2,701,727
STOP MEANS FOR LIMITING VEHICLE AXLE MOVEMENT

Frank F. Linn, Venice, Calif., assignor, by mesne assignments, to Daisy A. Linn and John B. Long, as trustees Application September 11, 1950, Serial No. 184,281

1 Claim. (Cl. 280—124)

The invention relates to vehicle axles such as are commonly used under trailers and the like, and more particularly, to that form of axle wherein the wheel supporting spindle is carried by offset arms secured to a shaft part journalled for rotation at the underside of the vehicle body and wherein the rotative movement of the shaft part is resisted by a helical spring mounted thereon. The particular form of axle to which the present invention relates is more fully described and claimed in my earlier Patents Nos. 2,426,513 issued August 26, 1947, and 2,455,787 issued December 7, 1948.

In axles of the present type, and as above noted, the wheel spindles are carried on radial arms of the axle for swinging in an arcuate amplitude of movement relative to the vehicle body supported by the axle and this movement is resisted by a helical spring mounted on and secured to the shaft part of the axle defining the center of arcuate movement of the spindles and arms. The spring is so wound and connected as to resiliently resist deflection of the spindles in a load bearing direction so as to thereby support the load and the connection of the coil is such as to cause a relative winding of the spring when subjected to such deflection.

It has been an increasing practice to employ or to require the employment of brakes on trailers. Such brakes, as will be understood, are mounted on the wheel spindle of the axle and operate by engagement with a brake drum on the wheel carried by the spindle to thereby stop or control the rotary movement of the wheel on the spindle. In the offset type of axle of the character above described, the application of brakes produces a relative arcuate movement of the spindle about the axis of its shaft connection to the vehicle thereby straining the helical spring above noted. In the normal construction and mounting of such axles the application of the brakes during the forward movement of the vehicle produces a relative winding of the helical spring and an application of the brakes during a reverse or rearward movement of the vehicle produces a relative unwinding of the spring. As will be understood, severe braking action of the loaded vehicle may thus unduly strain the helical spring employed in the axle and thereby do permanent damage to the spring. This deleterious action is most severe in the application of the brakes during the reverse movement of the vehicle tending to unwind the spring.

In accordance with the present invention and as a principal object thereof, I provide in an axle of the character described, means functioning to limit the relative arcuate movement of the wheel spindle as caused by the application of the brakes so as to thereby, at all times and under all braking conditions, adequately and fully protect the helical spring against overstressing and injury.

Another object of the present invention is to provide a stop means of the character described which may be formed as an integral part of the bearing for the axle and which will in no wise interfere with the normal operation of the axle or the movement of the wheel spindle through its customary arc of movement under load conditions and reflex action when subjected to normal road shock occasioned by the movement of the vehicle over a bumpy road.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claim.

Referring to said drawings:

Figure 1 is a bottom view of the vehicle axle constructed in accordance with the present invention.

Figure 2 is a cross-sectional view of the axle taken substantially on the plane of line 2—2 of Figure 1.

Figure 3 is a cross-sectional view of the axle taken substantially on the plane of line 3—3 of Figure 2.

Figure 4 is a cross-sectional view similar to Figure 2 but showing a modified form of the invention.

Figure 5 is a cross-sectional view of the axle illustrated in Figure 4 and is taken substantially on the plane of line 5—5 of Figure 4.

Figure 6 is a cross-sectional view similar to Figure 4 but showing a further modified form of the invention.

Figure 7 is a cross-sectional view of the form of the invention illustrated in Figure 6 and is taken substantially on the plane of line 7—7 of Figure 6.

The axle of the present invention is illustrated in the accompanying drawing in conjunction with a vehicle body 8 such as a trailer and is provided with bearing means 9 and 11 adapted for attachment as by bolts 12 to the underside of the body 8 as is best seen in Figure 1. Journalled for rotation within the bearing means 9 and 11 and extending across the width of the body is a shaft 13 having the opposite ends thereof projected through the bearings and secured to radially extending arms 14 and 16. The arms 14 and 16 are mounted in spaced relation to the sides of the vehicle body so as to permit the arms to swing in an arcuate amplitude of movement generally parallel to the sides of the body and perpendicular to the axis of shaft 13 which also defines the axis of rotation of the arms. Wheel spindles 17 and 18 are secured to the arms 14 and 16 in radially spaced relation to the shaft 13 and extend outwardly from the arms in substantially parallel relation to the shaft 13. Wheels 19 and 21 are journalled for rotation on the spindles 17 and 18, as illustrated in the drawing, so that the center of rotation of the wheels, see Figure 2, is offset from the axis of the shaft 13. With further reference to Figure 2 it will be seen that a loading of the vehicle body 8 will depress the shaft 13 relative to the spindles 18 and thereby cause a rotation of the arms 14 and 16 in a counter-clockwise direction, as viewed in Figure 2. This rotative movement of the arms and the shaft 13 is resiliently resisted by helical springs 22 and 23, mounted around the shaft 13 adjacent the bearings 9 and 11 and having their opposite ends 24 and 26, and 27 and 28, respectively, secured to the shaft 13 and the bearings 9 and 11. Ends 24 and 27 of the springs are secured to the shaft 13 by means of spring clips 29 and 31 suitably anchored, as by welding, to the shaft, while the opposite ends 26 and 28 of the springs are inserted into and anchored within openings 32 and 33 in the bearings 9 and 11.

The arrangement of the helical springs 22 and 23 is such that the movement of the arms 14 and 16 in a load bearing direction, that is, counter-clockwise, as viewed in vehicle 2, as above noted, will cause a relative winding of the spring, that is, a torsional stressing of the spring tending to further twist the spring coils in the direction in which they are wound. In the normal placement of the axle under the vehicle body, the spindles 17 and 18 are mounted to the rear of the shaft 13 and under rated load the arms 14 and 16 will assume an approximate horizontal position placing the spindles 17 and 18 rearwardly of the shaft 13 at approximately the same elevation. The springs 22 and 23 are designed to support the arms 14 and 16 in approximately horizontal position under rated load and to permit an arcuate deflection of these arms in response to road jars from a position of the spindles somewhat below a horizontal position of the arms to approximately a vertical position of the arms, the latter corresponding to a maximum load resistant movement and what is sometimes referred to as a "dead axle."

Mounted on the spindles 17 and 18 are brakes 34 and 36 which engage brake drums 37 and 38 carried by wheels 19 and 21 so as to control the rotation of the wheels on the spindles. Any of the standard types of brakes available in the art may be used and for the purposes of the present disclosure an electric type trailer brake is indicated. These brakes operate by means of an electro-magnetic clutch, including a magnet affixed in stationary relation to the spindle and an armature secured for rotation with the wheel drum, the magnet being energized by a source of electrical potential such as the battery of the towing vehicle connected to the magnet by an electrical conduit 39. Energizing of the magnet causes it to cling to the revolving armature which, in turn, is connected to a brake band or shoe and causes the latter to press against the revolving brake drum. A current controller operated from the driver's seat permits the driver to apply the desired amount of braking power.

As will be understood from the foregoing, the application of the brakes during the forward movement of the vehicle imparts to the spindles a torque tending to depress the shaft 13 and thereby swing the arms 14 and 16 in a counter-clockwise direction, as viewed in Figure 2, in the same direction as caused by loading the vehicle. This action of the brakes thereby causes a relative tightening or winding of springs 22 and 23. As will be clear from Figures 1 and 3, the springs are constructed with the inside diametrical surfaces of the coils adjacent to the outside periphery of the shaft 13, and, while the space therebetween will permit movement of the arms 14 and 16 to vertical position, any movement past such position under excessive or emergency braking will cause the springs to wind down against the shaft and thus prevent their being strained past their elastic limits. Thus, the springs are best adapted to withstand a winding in this direction of torsional strain. The more serious problem arises on the application of the brakes during the rearward movement of the vehicle when a reverse torque is applied to the spindles thereby causing a relative raising of the shaft 13 and a swinging of the arms 14 and 16 in a clockwise direction, as viewed in Figure 2. This last mentioned arcuate deflection of the arms is in the normal direction urged by the springs 22 and 23 and is thereby aided by the springs in causing a relative unwinding of springs and a stressing of the springs in a direction which they are less able to withstand. A severe application of the brakes in such a rearward movement of the vehicle may cause a stressing of the springs beyond their elastic limit thereby causing the springs to assume a permanent set. As a principal feature of the present invention means is provided on the axle for limiting the aforementioned clockwise rotation of the arms 14 and 16 to a degree of movement at all times within the safe limits of torsional stress on the springs.

With reference to Figures 2 and 3 it will be seen that each of the bearings 9 and 11 is composed of two sections, including a body section 41, formed to overlie the shaft 13 and to engage the under side of the vehicle body, and is formed with openings for receipt of the fastening bolts 12. A cap section 42 is formed to underlie the shaft 13 and is secured to the body section 41 in encompassing relation around the shaft 13 by means of bolts 43. The stop means for limiting the movement of the arm, as above described, is preferably provided as a part of the bearing construction and is here shown on each of the bearings in the form of an arm 44 formed as an integral part of the cap section 42 and being offset and depending therefrom in the normal positioning of the axle. The arm 44 is provided with an offset lower end 46 which normally underlies the adjacent axle arm 14—16 in spaced relation but in the path of movement thereof so as to engage such arm and limit its arcuate movement in a downward direction of the spindle, that is, clockwise, as viewed in Figure 2.

The spacing of the stop end 46 from the under side of the arm 16, as seen in Figures 2 and 3, is such as to permit the normal oscillation of the arm in deflection and rebounding in response to road shock to which the axle is subjected, but which will limit the unwinding action on the helical springs within a range of stress that is perfectly safe for the spring. Thus, upon the severe application of the brakes during a rearward movement of the vehicle, the axle arms 14 and 16 will swing in a clockwise direction, as viewed in Figure 2, until the arms rest upon the stops 46, when further clockwise movement of the arms is prevented.

A modified form of the invention is illustrated in Figures 4 and 5, wherein a second stop is provided on the upper side of the arms to prevent over-straining of the springs upon application of the brakes while the vehicle is moving in a forward direction. As explained above the applying of the brakes during such movement swings the arms in an upward direction, that is, in the same direction urged by the load. Thus, a severe application of the brakes on a fully loaded vehicle while moving a relatively fast rate of speed may throw the arms well past their vertical, maximum load bearing position and produce a stressing of the springs beyond their elastic limit. In the form of the invention illustrated in Figures 4 and 5, the bearing cap section 42' is provided with an integral web or arm 44' extending both above and below the adjacent axle arm 16' and is provided with offset upper and lower ends 47 and 48 which, respectively, overlie and underlie the arm 16' in the path of movement thereof so as to engage the arm and serve as a stop therefor limiting the movement of the arm in both the spring winding and spring unwinding directions. The upper stop 47 is preferably positioned to limit the deflection of arm 16' to approximately its vertical, maximum load bearing position, thereby limiting the winding stress on spring 23'. Stop 48 is preferably located a short distance under the horizontal position of arm 16', at approximately the same location as stop 46 in the first described embodiment, so as to limit the unwinding action of spring 23' in the manner above described.

A further modified form of the invention is illustrated in Figures 6 and 7 wherein the upper stop 47' is provided on an upstanding arm 44'' formed as an integral part of the bearing body section 41'. The stop 47' is preferably located to limit the movement of the adjacent axle arm 16'' to a vertical, maximum load bearing position as described in the first modified form of the invention. A lower stop 46 may be provided on the cap bearing section 42 as illustrated in the first described embodiment of the invention.

I claim:

A vehicle axle comprising, a shaft, bearing means for said shaft including a body section formed to overlie said shaft and adapted for attachment to the underside of a vehicle body to be supported by said axle and a cap section formed to underlie said shaft and for attachment to said body section, an arm secured to and extending radially from said shaft, a spindle carried by said arm in spaced and substantially parallel relation to said shaft, a helical spring surrounding said shaft having one end secured thereto and its opposite end secured to said bearing and arranged with the inside diametrical surfaces of the coils of said spring adjacent to the outside periphery of said shaft for support thereon upon rotative displacement between said shaft and said bearing in a winding direction of said spring and being spaced to permit said rotative displacement between a substantially horizontal position of said arm under a normal load condition and a substantially vertical position of said arm, brake means connected to said spindle for braking the movement of a wheel mounted thereon and causing when operated in a forward movement of said vehicle a rotation of said shaft in a direction tending to wind said spring and when operated in a reverse movement of the vehicle a rotation of said shaft in an opposite direction tending to unwind said spring, first and second stop members secured to and extending from said bearing cap and body sections respectively, said first stop member having a portion positioned to underlie said arm adjacent said spindle when in said substantially horizontal position for engagement thereby to prevent a relative rotative displacement of said shaft and arm in a spring unwinding direction and said second stop member having a portion positioned to lie in proximity to said arm adjacent said spindle when in said substantially vertical position for engagement thereby to prevent a relative rotative displacement of said shaft and arm in a spring winding direction.

References Cited in the file of this patent

UNITED STATES PATENTS

| | | |
|---|---|---|
| 2,426,513 | Linn | Aug. 26, 1947 |
| 2,438,432 | Edwards | Mar. 23, 1948 |
| 2,542,261 | Probst | Feb. 20, 1951 |